United States Patent
Pribula et al.

(10) Patent No.: US 8,466,621 B2
(45) Date of Patent: Jun. 18, 2013

(54) CONVERSION OF VEHICULAR INDICATOR LIGHTS TO MULTI-FUNCTION INDICATORS

(75) Inventors: Dave Pribula, Wake Forest, NC (US); Evan J. Calarco, Schenectady, NY (US)

(73) Assignee: Custom Dynamics LLC, Wake Forest, NC (US)

( * ) Notice: Subject to any disclaimer, the term of this patent is extended or adjusted under 35 U.S.C. 154(b) by 323 days.

(21) Appl. No.: 12/904,499

(22) Filed: Oct. 14, 2010

(65) Prior Publication Data

US 2011/0291476 A1    Dec. 1, 2011

Related U.S. Application Data

(60) Provisional application No. 61/350,312, filed on Jun. 1, 2010.

(51) Int. Cl.
*B60Q 1/14* (2006.01)
*B60Q 1/46* (2006.01)

(52) U.S. Cl.
USPC ............................ 315/77; 315/82; 307/10.8

(58) Field of Classification Search
USPC .. 315/77, 80, 82, 83; 307/10.1, 10.8; 362/487
See application file for complete search history.

(56) References Cited

U.S. PATENT DOCUMENTS

| | | | |
|---|---|---|---|
| 5,521,466 A * | 5/1996 | Vincent | 315/77 |
| 5,767,589 A | 6/1998 | Lake et al. | |
| 5,841,203 A * | 11/1998 | Chambers et al. | 307/10.8 |
| 5,900,679 A | 5/1999 | Lake et al. | |
| 6,025,656 A | 2/2000 | Slater | |
| 6,153,975 A * | 11/2000 | Perdec | 315/82 |
| 6,504,306 B2 * | 1/2003 | Menze | 315/82 |
| 6,545,600 B1 | 4/2003 | Boner | |
| 7,199,487 B2 * | 4/2007 | Hayes | 307/10.1 |
| 7,646,291 B2 | 1/2010 | Counts | |
| 8,129,909 B1 * | 3/2012 | Hoekstra | 315/82 |
| 2009/0190366 A1 | 7/2009 | Weitzel | |
| 2011/0287637 A1 * | 11/2011 | Workman | 439/35 |

FOREIGN PATENT DOCUMENTS

WO    2007/095416 A2    8/2007

* cited by examiner

*Primary Examiner* — Tung X Le
(74) *Attorney, Agent, or Firm* — Coats & Bennett, P.L.L.C.

(57) ABSTRACT

Vehicle indicator lights, such as run-brake lights and/or side running lights, are converted to run-turn-brake indicator lights. A run-turn-brake converter is connected to vehicle-supplied run, brake, left turn, and right turn signal leads, the run-turn-brake converter producing left and right run-turn-brake signals. Existing vehicle wiring is reconfigured by disconnecting a first lead wire from the low-intensity input of a first three-terminal brake-run light socket, disconnecting a second lead wire from the low-intensity input terminal of a second three-terminal brake-run light socket, disconnecting a third lead wire from the high-intensity input terminal of the second three-terminal brake-run light socket, and connecting the second lead wire to the high-intensity input terminal of the second three-terminal brake-run light socket. The left and right run-turn-brake signals are connected to the sockets via the second lead wire and via a fourth lead wire, respectively.

9 Claims, 7 Drawing Sheets

CONVERSION OF VEHICULAR INDICATOR LIGHTS TO MULTI-FUNCTION INDICATORS

RELATED APPLICATION

This application claims priority under 35 U.S.C. §119(e) to U.S. Provisional Patent Application Ser. No. 61/350,312, filed 1 Jun. 2010 and titled "Conversion of Vehicle Indicator Lights to Multi-Function Indicators." The entire contents of the foregoing provisional patent application are incorporated by reference herein.

TECHNICAL FIELD

The present invention relates generally to brake lights, tail lights, and indicator lights for a vehicle. More particularly, the invention relates to methods and apparatus for converting one or more single- or dual-function lights to run-turn-brake indicators.

BACKGROUND

Motor vehicles use several lights mounted externally on the vehicle to indicate information to other drivers and pedestrians. In particular, several lights are generally mounted on the rear end of the vehicle to signal drivers and pedestrians behind the vehicle. Additional lights may be placed on the sides of the vehicle, near the rear, to provide additional signals to drivers behind the vehicle, especially those that might be positioned to the left or right of the vehicle FIG. 1 illustrates a typical arrangement of signal lights for the rear and rear/side of a motor vehicle, such as a motorcycle. From top to bottom, the indicator lights include a right-side running light 110, a right-tail brake/run light 120, a left-tail brake/run light 130, and a left-side running light 140. The right-side and left-side running lights are powered whenever the vehicle is running, to provide general visibility for the vehicle. Likewise, the right-tail and left-tail brake/run lights are also powered when the vehicle is running. In the pictured arrangement, the right-tail and left-tail lights are dual-filament bulbs—one filament, powered through an intermediate or "low-side" connector pin, is always energized when the vehicle is running. An additional filament, powered through the "high-side" connector pin, is energized when the brakes of the vehicle are activated. Thus, the intensity of the light emitted from the bulb is substantially greater when the brakes are activated.

Bulbs using light-emitting diodes (LEDs) rather than incandescent filaments are becoming increasingly popular, both as factory-installed equipment and as replacement parts for installation into standard sockets. Dual-intensity LED-based bulbs are available, including as replacements for dual-intensity incandescent bulbs. While the internal wiring of these three-terminal devices generally differs from that of incandescent bulbs, the operation is the same: a high-level voltage (e.g. 12 volts) on the "high-side" terminal produces a substantially greater light output than the same voltage applied to the "low-side" terminal.

Certain drivers desire enhanced visibility of their vehicles. This is a particular concern for many motorcycle drivers, as motorcycles are often overlooked by other drivers. Accordingly, improved lighting systems for motor vehicles are needed.

SUMMARY

Methods and apparatus for converting vehicle indicator lights to multi-function indicator lights, i.e., run-turn-brake indicator lights, are disclosed below. In particular, left and right run-brake lights are converted to left and right run-turn-brake signals. Furthermore, in some embodiments, left and right running lights are converted to left and right run-turn-brake signals. With the converter wiring harness and the techniques described herein, existing vehicle wiring can be easily reconfigured to accommodate the new lighting functions.

An example method for converting vehicle indicator lights to multi-function indicators includes connecting a run-turn-brake converter circuit to vehicle-supplied run, brake, left turn, and right turn signal leads, where the run-turn-brake converter circuit is configured to convert run, brake, left turn, and right turn input signals into a left run-turn-brake signal and a right run-turn-brake signal, and to output the left and right run-turn brake signals via left and right run-turn-brake signal leads, respectively. The existing vehicle wiring is reconfigured by disconnecting a first lead wire from the low-intensity input terminal of a first three-terminal brake-run light socket (e.g., the right-hand tail-light socket), disconnecting a second lead wire from the low-intensity input terminal of a second three-terminal brake-run light socket (e.g., the left-hand tail-light socket), disconnecting a third lead wire from the high-intensity input terminal of the second three-terminal brake-run light socket, and connecting the second lead wire to the high-intensity input terminal of the second three-terminal brake-run light socket.

Then, one of the left and right run-turn-brake signal leads (e.g., the left run-turn brake signal lead) is connected to the high-intensity input terminal of the second three-terminal brake-run light socket, via the second lead wire, i.e., via the lead wire formerly used to carry the running-light signal to the light socket. The remaining one of the left and right run-turn-brake signal leads is connected to the high-intensity input terminal of the first three-terminal brake-run light socket, via a fourth lead wire, i.e., via the lead wire formerly used to carry the brake signal to the light socket.

In some embodiments, the run-turn-brake converter circuit is installed by unplugging a connector assembly that couples the vehicle-supplied run signal lead to first wiring electrically connected to the first and second lead wires and that couples the vehicle-supplied brake signal lead to second wiring electrically connected to the third and fourth lead wires. In these embodiments, the left and right run-turn-brake signals are connected to the reconfigured three-terminal light sockets by installing a converter wiring harness to electrically connect the left run-turn-brake signal lead and the right run-turn-brake signal lead to the first wiring and second wiring, respectively. In some of these embodiments, unplugging the connector assembly disconnects the vehicle-supplied run signal lead from left and right single-intensity running lights, and the method further comprises connecting the left run-turn-brake signal lead and the right run-turn-brake signal lead to the left and right single-intensity running lights, respectively, using the converter wiring harness.

Other embodiments of the invention include a converter wiring harness for converting vehicle indicator lights to multi-function indicators. This converter wiring harness includes a first connector, comprising at least three terminals and configured to mate with a vehicle-installed connector supplying run, brake, left turn, and right turn signal leads, a second connector, comprising at least three terminals and configured to mate with a vehicle-lighting connector connected to left and right dual-intensity, brake-run light sockets, and a third connector, comprising at least two terminals. A first terminal of the first connector is wired to a corresponding first terminal of the second connector (e.g., to carry a ground signal), and first and second terminals of the third connector are wired to second and third terminals of the second connector (e.g., to carry left and right run-turn-brake signals from an RTB converter). In some embodiments, the converter wiring harness further includes first and second side-light connectors having at least two terminals each. In these embodiments, the first terminal of the third connector is wired to a first terminal of a first one of the side-light connectors and the second terminal of the third connector is wired to a first terminal of the other one of the side-light connectors. The first terminals of the first and second connectors are wired to a second terminal of each of the side-light connectors.

Other embodiments are also described, including a vehicle lighting system including a converter wiring harness like the one summarized above. Of course, the present invention is not limited to the above features, advantages, contexts or examples, and those familiar with vehicle lighting systems will recognize additional features and advantages upon reading the following detailed description and upon viewing the accompanying drawings.

DETAILED DESCRIPTION

One technology used for enhancing visibility of motor vehicles is the "run-turn-brake" (or "run-brake-turn") controller circuit. These circuits convert conventional single-level signal voltages to one or more multi-level and/or pulsed signal voltages. For instance, the electronics in a run-turn-brake controller (RTB controller, or RTB converter) can combine a left-turn signal line, a brake signal line, and a running-light line to produce a single run-turn-brake signal. This run-turn-brake signal in this example will produce a steady high-voltage level (e.g., 12 volts) when only the brake signal line is active, an intermediate-voltage level (e.g., 6 volts) when only the running-light line is active, a signal that alternates between the high-level voltage level and zero volts when only the turn-signal is active, and a signal that alternates between the high-level voltage level and the intermediate-level voltage level when both the brake signal line and the turn-signal line are active. Other configurations are also possible.

Figure 1:
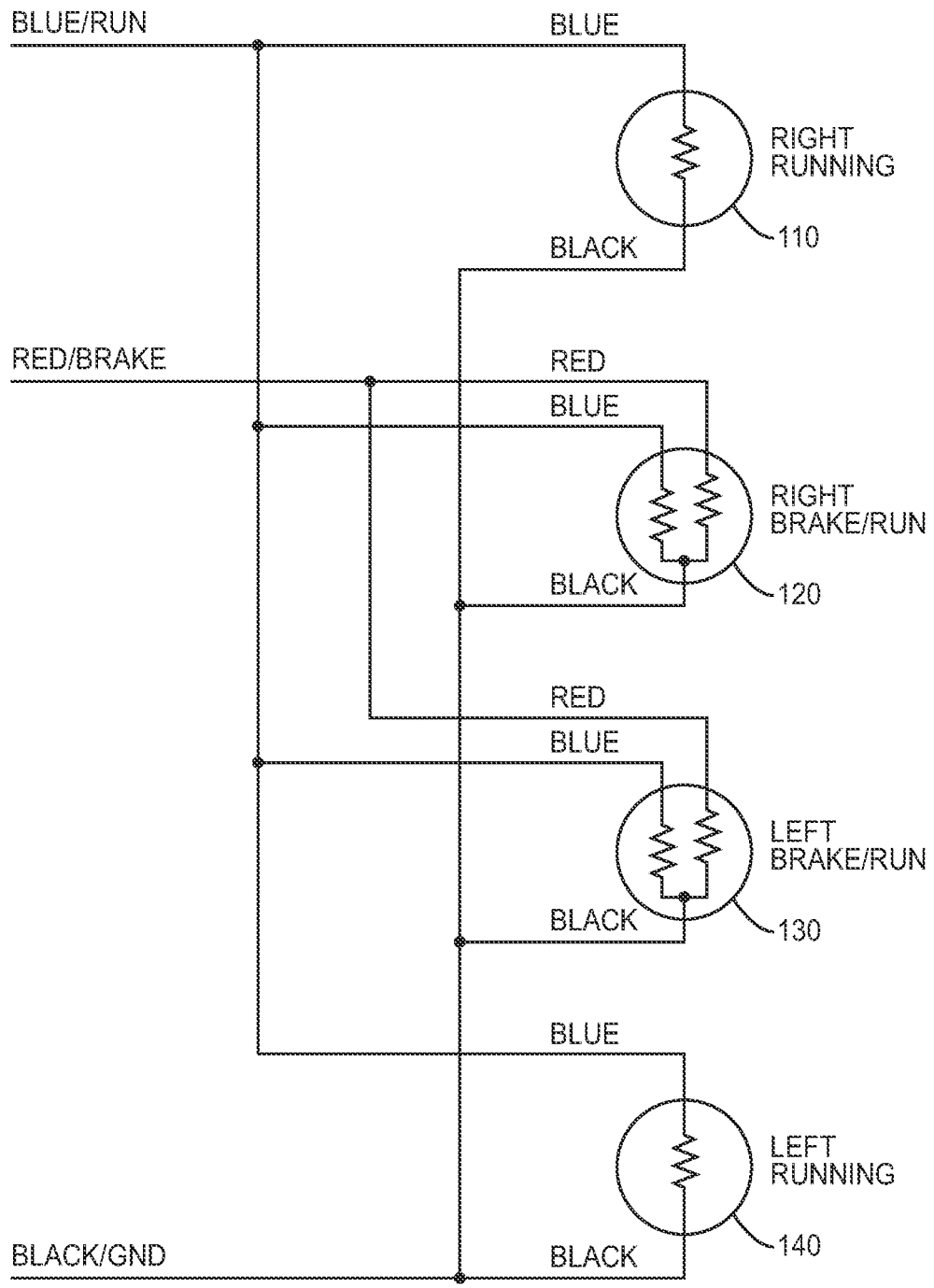
FIG. 1 is a schematic diagram illustrating a portion of the wiring of an exemplary vehicle lighting system.
Figure 2:
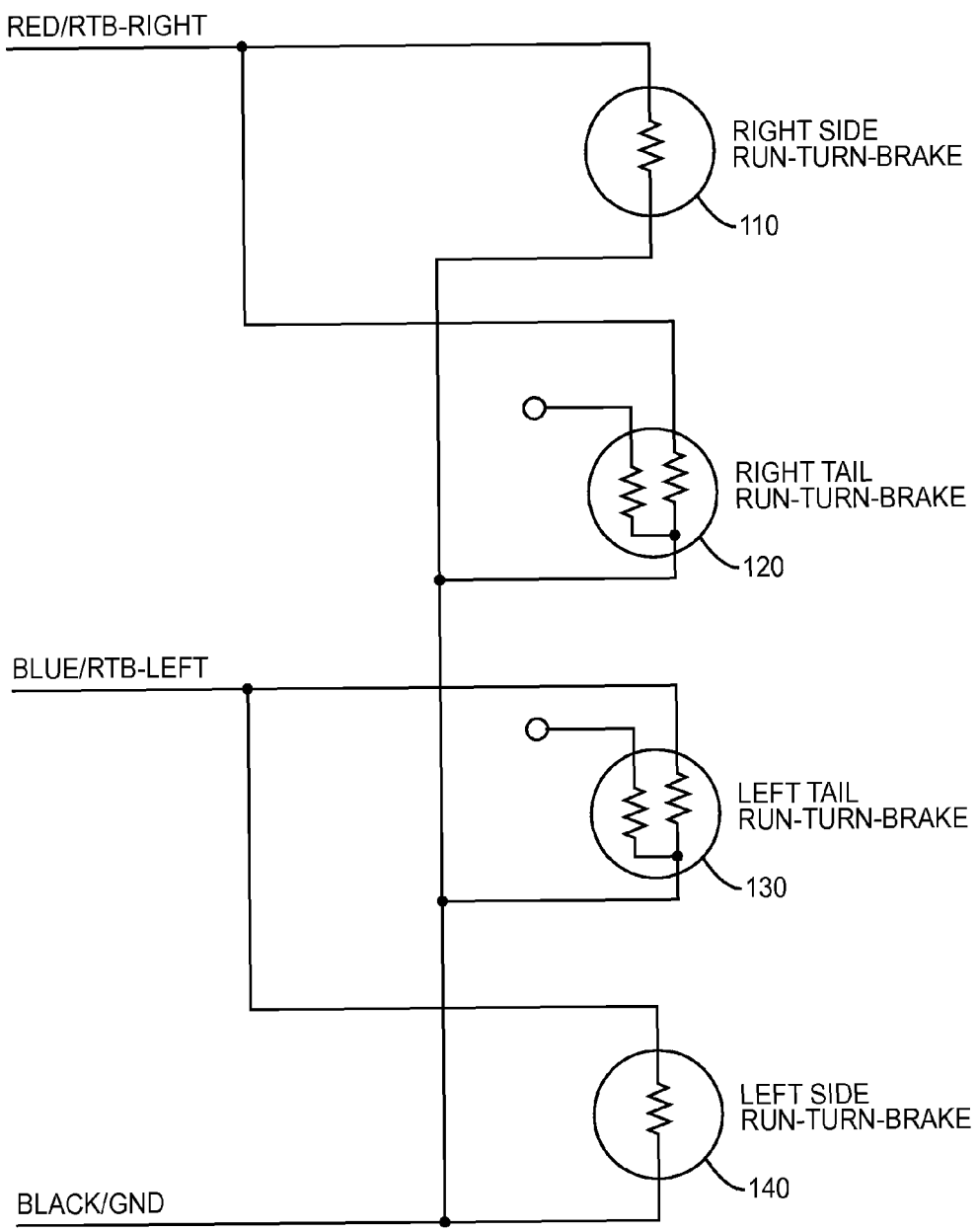
FIG. 2 is a schematic diagram illustrating a portion of the wiring of an enhanced visibility vehicle lighting system.
Figure 3:
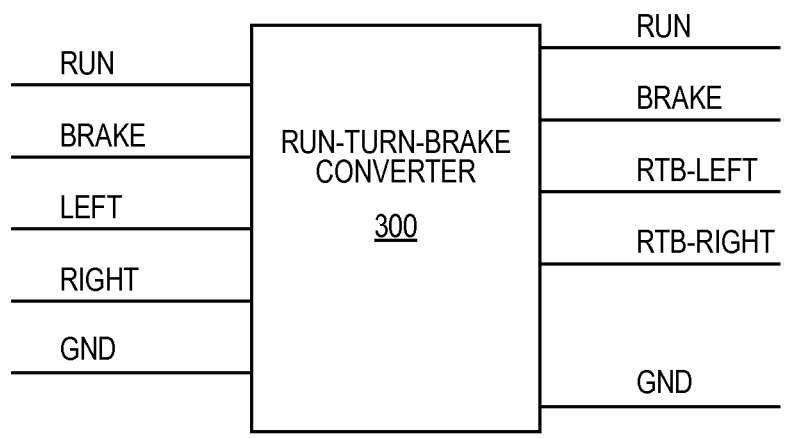
FIG. 3 illustrates exemplary inputs and outputs of a run-turn-brake (RTB) converter.

FIG. 3 is an exemplary diagram illustrating the inputs and outputs of such a converter. Examples of commercially available units include the Street Magic™ HD Triple Play converter available from Custom Dynamics® LLC (www.customdynamics.com) and adapted for Harley Davidson motorcycles. Those skilled in the art will appreciate that the inputs and outputs will vary depending on the lighting configuration of the target vehicle; the connectors used in or in connection with an RTB controller will also vary depending on the connectors employed in the target vehicle. Those skilled in the art will also appreciate that additional circuits might be employed in or in connection with an RTB controller to make the signals compatible with LED-based lighting, in addition to or instead of incandescent lighting, and that some converters may include extra effects, such as an initial strobing effect when a brake light is first activated.

In addition to the RTB controller circuits discussed generally above, various circuits for controlling vehicle lighting have been described in patents and patent applications, including: U.S. Pat. No. 5,767,589 to Lake et al.; U.S. Pat. No. 7,646,291 to Counts; U.S. Pat. No. 6,545,600 to Boner; U.S. Pat. No. 6,025,656 to Slater; US Patent Application Pub. No. 2009/0190366 to Weitzel; and US Patent Application Pub. No. 2008/0007180 to Kesterson. The entire contents of each of the foregoing patents and patent application publications are incorporated herein, to provide context and background for the inventive apparatus and techniques described herein.

Figure 4:
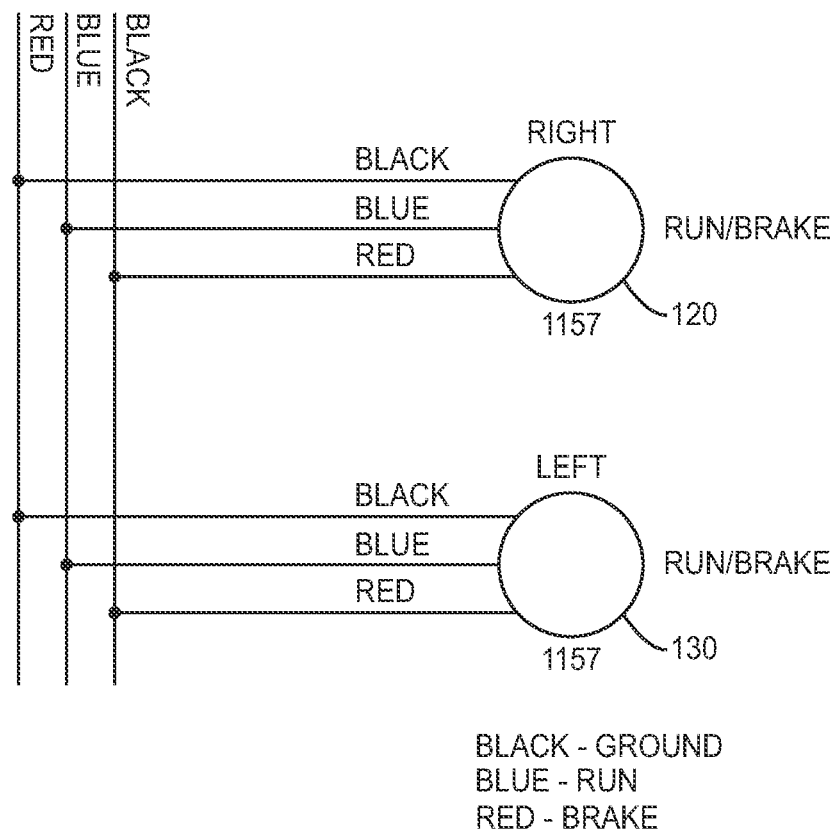
FIG. 4 illustrates conventional wiring to a pair of dual-intensity bulb sockets.

A factory-installed running/brake light may typically use a dual-intensity (or dual-filament) bulb installed in a three-terminal socket, such as the commonly used 1157 socket. Three wires connect to such a socket. A first wire (e.g., a blue wire) carries the "running light" (or "parking light") signal, which is active (e.g., at 12 volts) whenever the vehicle is running. A second wire (e.g., a red wire) carries the brake signal, which is active (e.g., at 12 volts) whenever the brake is applied. A third wire (e.g., a black wire) carries a reference (e.g., ground). This is shown in FIG. 4.

Figure 5:
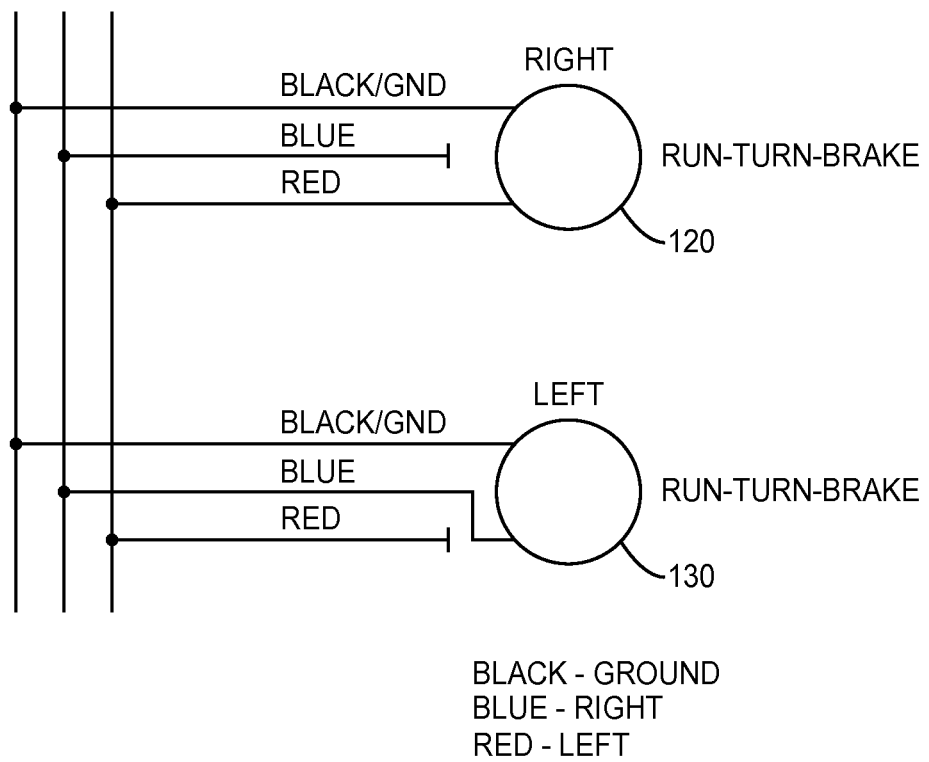
FIG. 5 illustrates a reconfiguration of a pair of dual-intensity bulb sockets, according to some embodiments of the present invention.

Such lights can be re-configured for operation with a RTB converter. Because the run-turn-brake signal from an RTB converter is a multi-level signal, only a single filament (or a single connection to an array of LEDs) is needed. Thus, only the "high-side" terminal and the ground terminal of the 3-terminal socket are used. As shown in FIG. 5, the wire to the low-side terminal is simply disconnected for one bulb (the left bulb in FIG. 5). For the other bulb (the right bulb in FIG. 5), the wires to each of the low-side and high-side terminals are disconnected, and the wire formerly connected to the low-side terminal is connected instead to the high-side terminal.

With this reconfiguration of the bulb socket wiring, the wires formerly connected to the running light signal and the brake light signal can be connected instead to the right and left run-turn-brake signals from the RTB converter. As discussed above, these multi-level signals will activate the bulbs at high intensity when only the brake is applied, will activate each bulb at a lower intensity when neither the brake nor the corresponding turn signal is activated. Furthermore, each bulb will alternate between a high intensity and a medium intensity when the brake is applied and the corresponding turn signal is activated, and between a high intensity and off when only the corresponding turn signal is activated.

Figure 6:
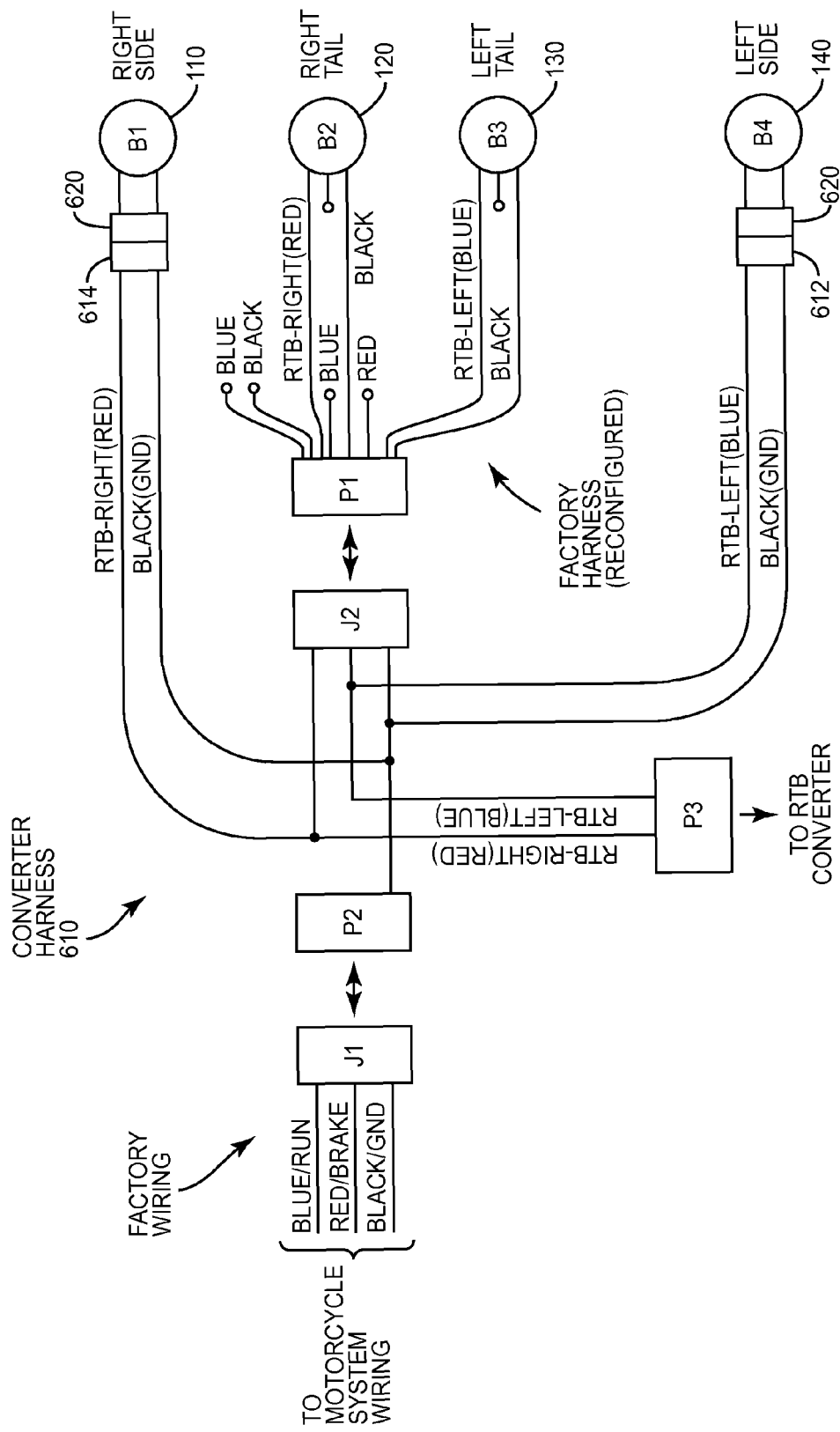
FIG. 6 illustrates the use of a converter harness to reconfigure the original wiring of a vehicle/accessory lighting system.

FIG. 6 illustrates a converter wiring harness 610 that facilitates the reconfiguration of a factory-installed set of lights that include a pair of run/brake lights and a pair of side running lights, as might be found on a motorcycle or other vehicle. In this particular arrangement, the factory installation has these four lights driven through a single 3-pin connector to a wiring harness that connects the system wiring to the lights; such an arrangement might be found in a motorcycle luggage accessory intended for mounting behind the seat, such as one of the Tour Pak line of accessories from Harley Davidson. (Tour Pak and Harley Davidson are claimed as trademarks of H-D Michigan, Inc.)

In the configuration of FIG. 6, the bulb sockets B1, B2, B3 and B4 are factory installed (either on the vehicle itself or on a stock accessory such as the Harley Davidson Tour Pak). B2 and B3 are 3-terminal sockets for carrying dual-intensity bulbs, whether incandescent or LED-based. B1 and B4 and are two-terminal sockets for holding a single-intensity bulb. J1 is a factory-installed connector that originally connects the motorcycle system wiring to a wiring harness from connector P1 to each of bulb sockets B1-B4. Thus, prior to the conversion described herein, P1 would normally be connected to J1.

According to one embodiment of the present invention, however, P1 is disconnected from J1, and a converter harness 610 is installed. The converter harness includes connectors P2 and J2, which connect to connectors J1 and J2, respectively. The converter harness further includes a two-wire connector P3, which is connected to the left and right run-turn-brake outputs of an RTB converter, as well as two-wire plugs 612 and 614, for connection to the side lights B2 and B3 of the vehicle or accessory, via connector terminals 620. As can be seen from FIG. 6, only the ground wire of the original system wiring is passed through the new configuration. The left and right run-turn-brake signals are substituted for the run and brake signals of the original wiring. With the reconfiguration of the three-terminal sockets discussed above, these substituted run-turn-brake signals are wired to the high-side terminals of each of bulb sockets B2 and B3, as well as to the active terminal of the side light sockets B1 and B4.

Those skilled in the art will appreciate that the converter wiring harness 610 illustrated in FIG. 6 is adapted to a particular wiring and lighting configuration. The techniques disclosed herein for reconfiguring factory-installed dual-filament bulb sockets and installing a converting wiring harness are more general, and may be applied to various other stock wiring and lighting configurations. Variations of the design shown in FIG. 6 are possible even for the same configuration—for example, in some embodiments the cable from the RTB converter may include a third wire for ground, obviating the need to pick up the ground reference from connector J1. In other cases, only the tail lights may be converted, so that the side lights remain running lights, in which case the converter harness of FIG. 6 may be configured to carry the running light signal (blue wire) to the left and right side running light sockets. Other variations of the wiring, to achieve the same effects, will be apparent to those of ordinary skill in the art.

Accordingly, embodiments of the present invention include several methods for reconfiguring a motor vehicle's indicator lighting system, wherein some of such methods are characterized by the steps of (a) reconfiguring the wiring of a pair of three-terminal bulb sockets by disconnecting the existing connections to the low-side terminals of each socket, disconnecting the existing connection to the high-side terminal of a first one of the pair of sockets, and connecting the wire that was previously connected to the low-side terminal of the first socket to the high-side terminal of that same socket; and (b) substituting a left run-turn-brake signal and right run-turn-brake signal for the previously existing run and brake signals. In some embodiments, this substitution may be accomplished by disconnecting a previously installed harness and inserting a converter harness that routes multi-level run-turn-brake signals from an RTB converter and substitutes those run-turn-brake signals for previously existing separate running light and brake signals.

Figure 7:
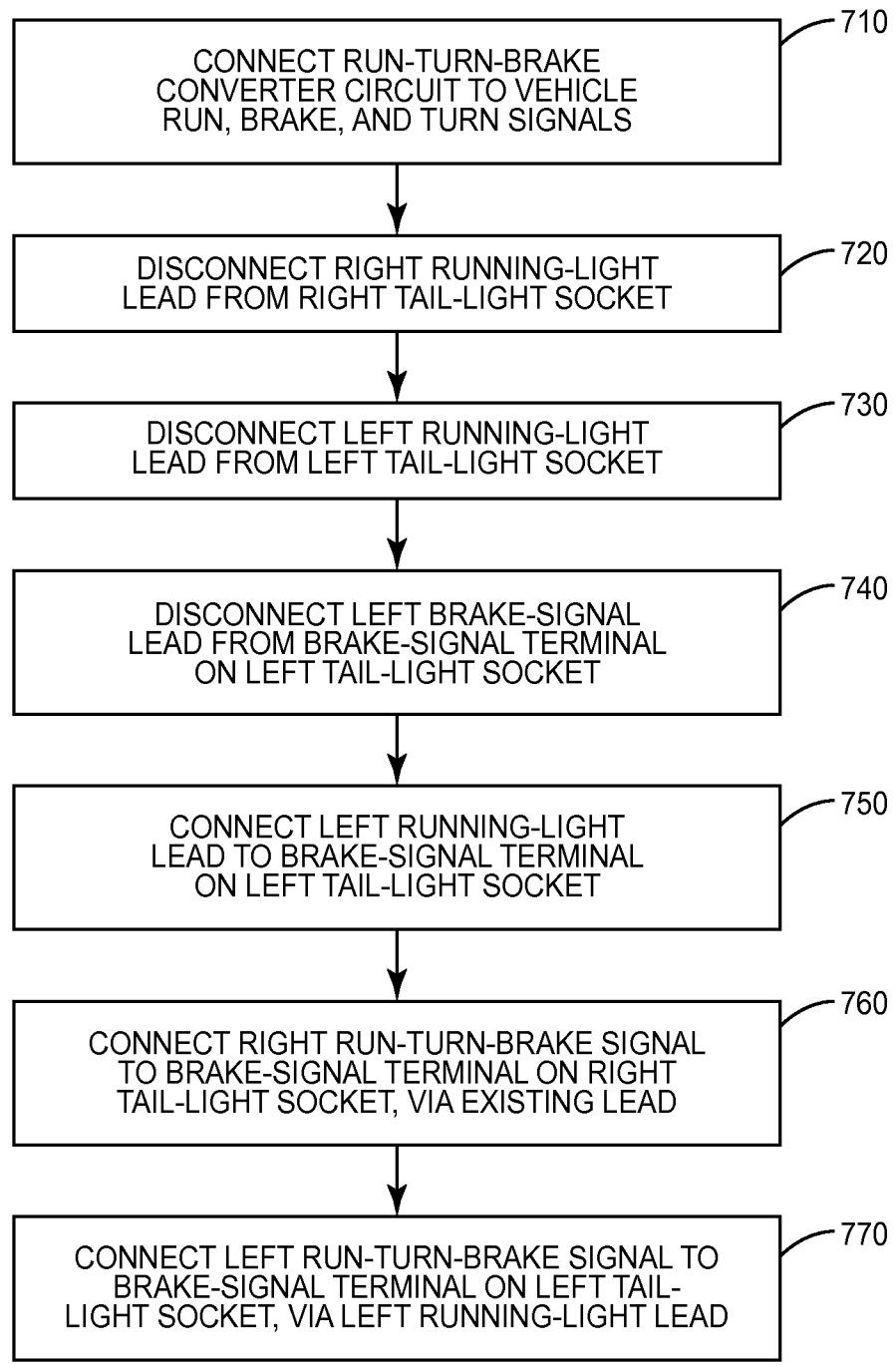
FIG. 7 is a process flow diagram illustrating a method for converting indicator lights to multi-function indicators.

FIG. 7 is a process flow diagram illustrating an example method for converting vehicle indicator lights to multi-function indicators according to the techniques described above. The illustrated process begins, as shown at block 710, with connecting an RTB converter circuit, as described earlier, to a vehicle's run, brake, and turn signals. In some applications, this is done by disconnecting a vehicle-installed connector carrying these signals and connecting this connector to a mating connector of the RTB converter. The specifics for this connection may vary, depending on the precise configuration of the RTB converter and the vehicle wiring.

The outputs of the RTB converter include a left run-turn-brake signal and a right run-turn-brake signal, carried by corresponding leads. These leads are connected to the existing wiring for the indicator lights according to the steps shown in blocks 720-770. (Of course, the steps illustrated in FIG. 7 need not be carried out in the particular order pictures.) Thus, the running-light leads are disconnected from the running-light (low-intensity) input terminals of the left and right tail-light sockets, as shown at blocks 720 and 730. In addition, the brake-signal lead is removed from the brake-signal terminal of the left tail-light socket, as shown at block 740. Then, the running-light lead that was disconnected from the left tail-light socket is connected to the brake-signal terminal of the left tail-light socket, as shown at block 750.

The result of the above wiring reconfiguration is that the left and right three-terminal tail light are each connected to only a single supply wire and a ground wire. In the example illustrated here, the reconfigured left tail-light socket is connected to the lead formerly used to carry the running-light signal, while the right tail-light socket is driven by the lead formerly used to carry the brake signal. (In other embodiments, this can be reversed, by simply reversing all of the references to "right" and "left" in the process flow diagram of FIG. 7.) These leads are connected to the left and right run-turn-brake signals, respectively, as shown at blocks 760 and 770. As was shown in FIG. 6, this can be done by interposing a suitable converter wiring harness between a first connector leading to the vehicle light controls and a second connector leading to the vehicle lights, with a third connector on the converter wiring harness connecting to run-turn-brake signal leads from the RTB converter.

The method illustrated in FIG. 7 (and variants thereof) may be extended to accommodate side lights. As noted above, these are often originally configured as single-intensity running lights. The converter wiring harness discussed above, however, may be adapted to supply left and right run-turn-brake signals to the left and right side lights, as shown in FIG. 6. Thus, some methods further include connecting the left run-turn-brake signal lead and the right run-turn-brake signal lead to the left and right single-intensity running lights, respectively, using the converter wiring harness.

Of course, the present invention may be carried out in other specific ways than those set forth without departing from the scope of the inventive techniques illustrated by specific embodiments illustrated herein. Thus, the present invention is not limited to the features and advantages detailed in the foregoing description, nor is it limited by the accompanying drawings.

What is claimed is:

1. A method for converting vehicle indicator lights to multi-function indicators, the method comprising:
 connecting a run-turn-brake converter circuit to vehicle-supplied run, brake, left turn, and right turn signal leads, wherein the run-turn-brake converter circuit is configured to convert run, brake, left turn, and right turn input signals into a left run-turn- brake signal and a right run-turn-brake signal, and to output the left and right run-turn brake signals via left and right run-turn-brake signal leads, respectively;
 disconnecting a first lead wire from the low-intensity input terminal of a first three- terminal brake-run light socket;
 disconnecting a second lead wire from the low-intensity input terminal of a second three-terminal brake-run light socket;

disconnecting a third lead wire from the high-intensity input terminal of the second three-terminal brake-run light socket;

connecting the second lead wire to the high-intensity input terminal of the second three-terminal brake-run light socket;

connecting a first one of the left run-turn-brake signal lead and the right run-turn-brake signal lead to the high-intensity input terminal of the second three-terminal brake-run light socket, via the second lead wire; and connecting the remaining one of the left run-turn-brake signal lead and the right run-turn-brake signal lead to the high-intensity input terminal of the first three-terminal brake-run light socket, via a fourth lead wire.

2. The method of claim 1, wherein the first and second three-terminal brake-run light sockets are right and left sockets for right and left dual-intensity indicator lights, respectively, and wherein the left run-turn-brake signal lead is connected to the high-intensity input terminal of the second three-terminal brake-run light socket, via the second lead wire.

3. The method of claim 1, wherein first and second three-terminal brake-run light sockets are left and right sockets for left and right dual-intensity indicator lights, respectively, and wherein the right run-turn-brake signal lead is connected to the high-intensity input terminal of the second three-terminal brake-run light socket, via the second lead wire.

4. The method of claim 1, wherein installing the run-turn-brake converter circuit comprises:

unplugging a connector assembly that couples the vehicle-supplied run signal lead to first wiring electrically connected to the first and second lead wires and that couples the vehicle-supplied brake signal lead to second wiring electrically connected to the third and fourth lead wires; and installing a converter wiring harness to electrically connect the left run-turn-brake signal lead and the right run-turn-brake signal lead to the first wiring and second wiring, respectively.

5. The method of claim 4, wherein unplugging the connector assembly disconnects the vehicle-supplied run signal lead from left and right single-intensity running lights, and wherein the method further comprises connecting the left run-turn-brake signal lead and the right run-turn-brake signal lead to the left and right single-intensity running lights, respectively, using the converter wiring harness.

6. A converter wiring harness for converting vehicle indicator lights to multi-function indicators, comprising:

a first connector, comprising at least three terminals and configured to mate with a vehicle-installed connector supplying run, brake, left turn, and right turn signal leads;

a second connector, comprising at least three terminals and configured to mate with a vehicle-lighting connector connected to left and right dual-intensity, brake-run light sockets;

a third connector, comprising at least two terminals including a first terminal and a second terminal, and configured to mate with a connector of a run-turn-brake converter circuit that respectively supplies left and right run-turn-brake signals to the first and second terminal of the third connector;

wherein a first terminal of the first connector is wired to a corresponding first terminal of the second connector, and wherein the first and second terminals of the third connector are wired to second and third terminals of the second connector.

7. The converter wiring harness of claim 6, further comprising first and second side-light connectors comprising at least two terminals each, wherein the first terminal of the third connector is wired to a first terminal of a first one of the side-light connectors and the second terminal of the third connector is wired to a first terminal of the other one of the side-light connectors, and wherein the first terminals of the first and second connectors are wired to a second terminal of each of the side-light connectors.

8. A motor vehicle indicator light system, comprising:

a vehicle lighting circuit configured to supply run, brake, left turn, and right turn signals, responsive to driver actions, via a first connector;

left and right three-terminal brake-run light sockets electrically connected to a second connector, wherein the second connector is configured to mate with the first connector but is disconnected from the first connector;

a run-turn-brake converter circuit configured to convert the run, brake, left turn, and right turn input signals into a left run-turn-brake signal and a right run-turn-brake signal and to output the left and right run-turn-brake signals via a third connector; and a converter wiring harness configured to electrically connect the left and right run-turn-brake signal leads to the left and right three-terminal brake-run light sockets, respectively, the converter wiring harness comprising:

a fourth connector, comprising at least three terminals and mated with the first connector;

a fifth connector, comprising at least three terminals and mated with the second connector;

a sixth connector, comprising at least two terminals and mated with the third connector;

wherein a first terminal of the fourth connector is wired to a corresponding first terminal of the fifth connector, and wherein first and second terminals of the sixth connector are wired to second and third terminals of the fifth connector.

9. The motor vehicle indicator light system of claim 8, further comprising left and right two-terminal side-light sockets; wherein the converter wiring harness further comprises first and second side-light connectors having two terminals each and mated to the left and right two- terminal side-light sockets, respectively; wherein the first terminal of the sixth connector is wired to a first terminal of a first one of the side-light connectors and the second terminal of the sixth connector is wired to a first terminal of the other one of the side-light connectors, and wherein the first terminals of the fourth and fifth connectors are wired to the second terminal of each of the side-light connectors.

* * * * *